(12) United States Patent
Tanimichi et al.

(10) Patent No.: US 7,096,109 B2
(45) Date of Patent: Aug. 22, 2006

(54) ADAPTIVE CRUISE CONTROL SYSTEM

(75) Inventors: Taisetsu Tanimichi, Mito (JP); Kimihiro Yamai, Hitachinaka (JP); Yuichi Kuramochi, Atsugi (JP); Hidefumi Adachi, Mito (JP); Eiichirou Kondou, Hitachinaka (JP); Kentarou Ueno, Atsugi (JP); Takafumi Suzuki, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 21 days.

(21) Appl. No.: 10/701,433

(22) Filed: Nov. 6, 2003

(65) Prior Publication Data
US 2004/0093145 A1    May 13, 2004

(30) Foreign Application Priority Data
Nov. 12, 2002    (JP)    ............... 2002-327668

(51) Int. Cl.
*B60T 7/12*    (2006.01)
(52) U.S. Cl. .................. 701/96; 701/93; 180/170; 340/436
(58) Field of Classification Search ............ 701/93, 701/96, 36, 70; 180/170; 340/425.5, 436, 340/438
See application file for complete search history.

(56) References Cited

U.S. PATENT DOCUMENTS

| 4,969,103 | A | 11/1990 | Maekawa |
| 6,226,588 | B1 * | 5/2001 | Teramura et al. ............. 701/93 |
| 6,273,204 | B1 | 8/2001 | Winner et al. |
| 6,411,883 | B1 | 6/2002 | Basten |
| 2002/0133285 | A1 | 9/2002 | Hirasago |

FOREIGN PATENT DOCUMENTS

| EP | 0983894 A2 | 3/2000 |
| EP | 0983894 A3 | 3/2000 |
| EP | 1160119 A1 | 12/2001 |
| JP | 2001-142169 | 4/1998 |
| JP | 10318009 A | 12/1998 |

* cited by examiner

*Primary Examiner*—Yonel Beaulieu
(74) *Attorney, Agent, or Firm*—Crowell & Moring LLP

(57) ABSTRACT

After cruise control is restored by an accelerating operation, the driver set speed is changed according to the displacement of the accelerator pedal. It becomes possible to reduce the driver set speed due to release of the accelerator pedal, that is, the vehicle can be decelerated by the engine. Even if the cruise control is restored, the cruise control is not conducted and the vehicle can be decelerated by the engine if the driver wants to decelerate the vehicle by the release of the accelerator pedal.

38 Claims, 7 Drawing Sheets

ADAPTIVE CRUISE CONTROL SYSTEM

BACKGROUND OF THE INVENTION

The present invention relates to a cruise control system for a vehicle.

There exists an adaptive cruise control system for a vehicle to mitigate the driving load on the driver of a car, for example, on a superhighway. To operate such an adaptive cruise control system of a car, the driver must manually push a button arranged on the handle of the car to start adaptive cruise control. In an ordinary fixed-speed control state in which the car follows a target or preceding car or in which the car is running straight, the driver needs to push only once the button to start adaptive cruise control. However, when the road is congested or when the road has many turns, the setting of adaptive cruise control is canceled each time the driver applies the brake. This leads to a problem of operation and safety that the driver must push the button to start adaptive cruise control each time the driver applies the brake. To overcome this problem, some methods are known. For example, JP-A-2000-142169 describes a method in which after the adaptive cruise control of a car is released, the adaptive cruise control is started again when the vehicle speed of the car reaches a predetermined speed to start adaptive cruise control by increasing the vehicle speed through operation of the accelerator pedal or accelerator.

SUMMARY OF THE INVENTION

However, in the prior art, the adaptive cruise control is started when the vehicle speed exceeds the adaptive cruise control start speed by increasing the vehicle speed by the accelerator. Assume a case in which the driver does not want to use the adaptive cruise control and an obstacle appears before the car after the driver accelerates the car, and hence the driver needs to decrease the vehicle speed. In this situation, since the adaptive cruise control is restored, the driver cannot decrease the vehicle speed.

It is therefore an object of the present invention, which has been devised to remove the problem, to change a driver set speed by an accelerator pedal such that after the adaptive cruise control is restored by an accelerator operation, the vehicle speed under adaptive cruise control is changed according to displacement of the accelerator pedal by the driver. Another object of the present invention is that after the driver steps on the accelerator pedal and hence the adaptive cruise control is restored, when the displacement of the accelerator pedal is decreased, the vehicle speed under adaptive cruise control is changed to thereby decrease the vehicle speed.

DESCRIPTION OF THE EMBODIMENTS

Figure 1:
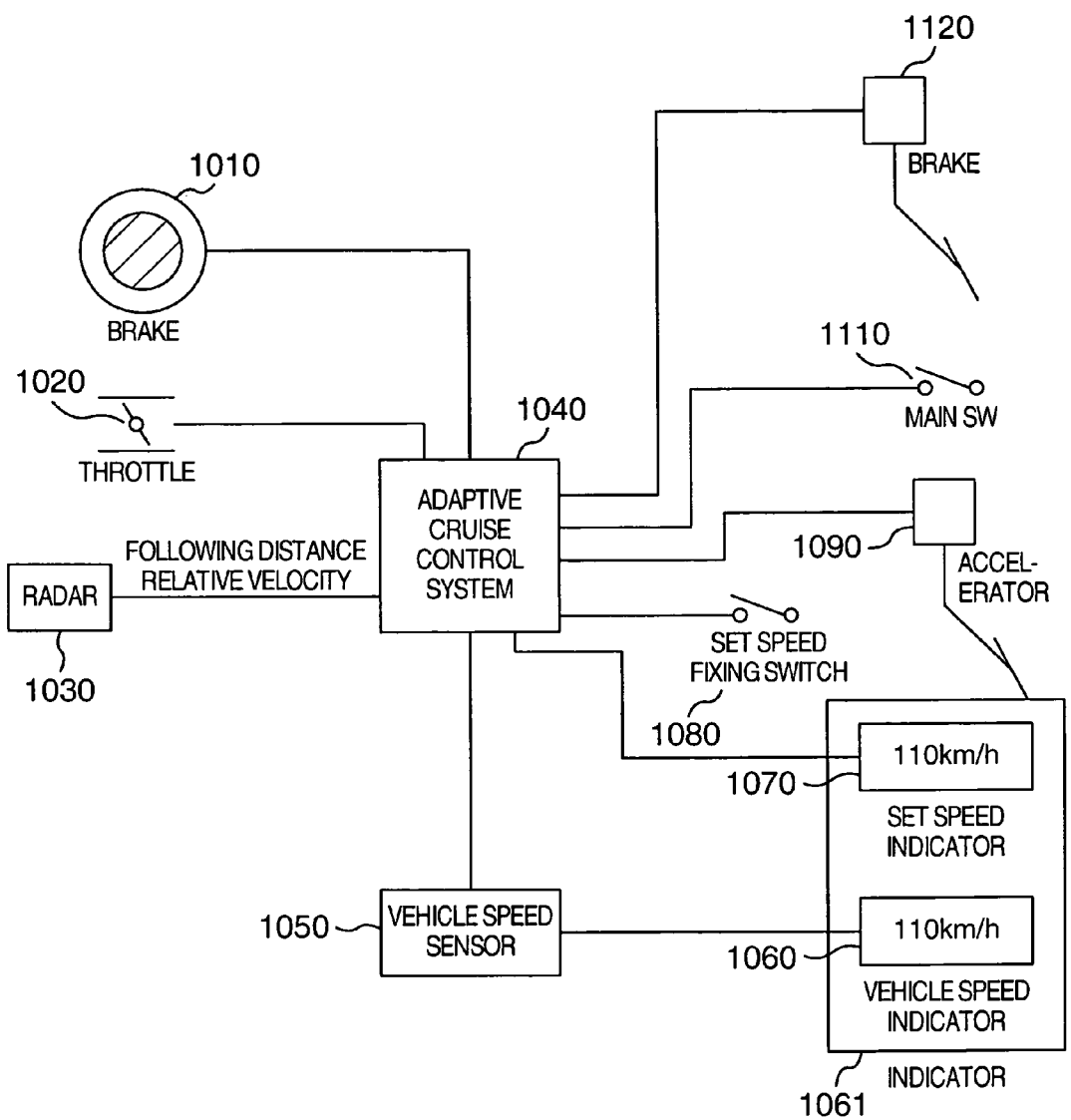
FIG. 1 is a system block diagram showing a configuration of an adaptive cruise control system.

Referring now to FIG. 1, description will be given of an embodiment of the present invention.

An adaptive cruise control system 1040 of FIG. 1 operates when a main switch 1110 is on. When the system 1040 is in operation, if a radar 1030 is sensing a target car running before the pertinent car, a brake 1010 and a throttle valve or throttle 1020 are controlled to regulate the vehicle speed and keep the following distance between the car and the target car constant according to a distance therebetween sensed by the radar 1030 and the vehicle speed sensed by a vehicle speed sensor 1050. If the radar 1030 is not sensing the target car, a set speed is determined according to displacement of an accelerator pedal 1090 and the vehicle speed sensed by the speed sensor 1050 to equalize the set speed to the vehicle speed to thereby regulate the vehicle speed.

As above, when the radar 1030 is not sensing the target car, the set speed is changed according to the displacement of the accelerator pedal 1090. However, when a set speed fixing switch 1080 is turned on, the driver set speed can be fixed to a driver set speed determined when the set speed fixing switch 1080 is turned on. When the driver steps on a brake pedal 1120 during the control operation with the fixed set speed, the control operation is cancelled.

A meter or an indicator 1061 displays the driver set speed in a driver set speed indicator 1070 and the vehicle speed in a vehicle speed indicator 1060.

Figure 2:
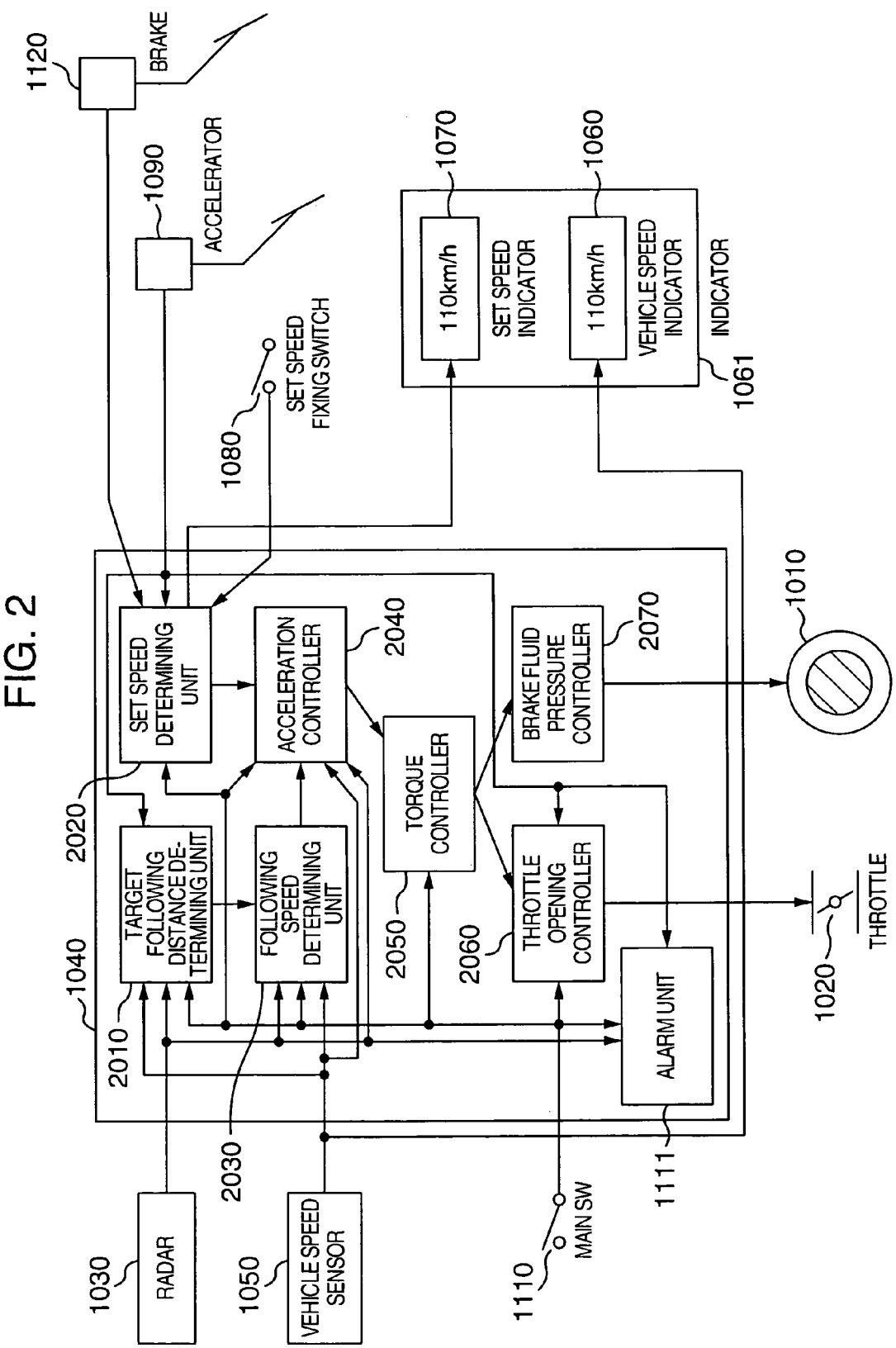
FIG. 2 is a block diagram showing an inner configuration of an adaptive cruise control system.

Referring next to FIG. 2, description will be given of a function of the adaptive cruise control system 1040.

A target following distance determining unit 2010 calculates a target following distance according to a relative velocity or speed and a distance between cars inputted from the radar 1030 and the vehicle speed inputted from the vehicle speed sensor 1050. The target following distance determining unit 2010 changes the target following distance according to the displacement of the accelerator pedal 1090. A following speed determining unit 2030 calculates a following speed to keep the target following distance according to the target distance, the relative velocity, and the vehicle speed.

A set speed determining unit 2020 calculates a driver set speed using the displacement of the accelerator pedal 1090. However, when the set speed fixing switch 1080 is turned on, the set speed determining unit 2020 fixes the set speed to a driver set speed determined when the switch 1080 is turned on.

When the radar 1030 is sensing the target car, an acceleration controller 2040 calculates target acceleration according to the following speed and the vehicle speed. When the radar 1030 is not sensing the target car, the acceleration controller 2040 calculates the target acceleration according to the driver set speed and the vehicle speed.

A torque controller 2050 calculates torque according to target acceleration and the vehicle speed, the torque accelerating or decelerating the vehicle according to the acceleration.

When the main switch 1110 is off, a throttle opening controller 2060 calculates throttle opening using the accelerator pedal displacement from the accelerator 1090. When the main switch 1110 is on, the throttle opening controller 2060 calculates throttle opening using the torque.

A brake fluid controller 2070 calculates brake fluid pressure according to the torque.

The throttle 1020 operates according to the throttle opening and the brake 1010 operates according to the brake fluid pressure to control the car such that the vehicle speed is equal to the following speed or the driver set speed.

When the following distance is less than a predetermined value, an alarm unit 1111 gives the alarm to the driver. However, when the displacement of the accelerator 1090 exceeds a predetermined threshold value, the alarm unit 1111 stops the sounding operation.

Figure 3:
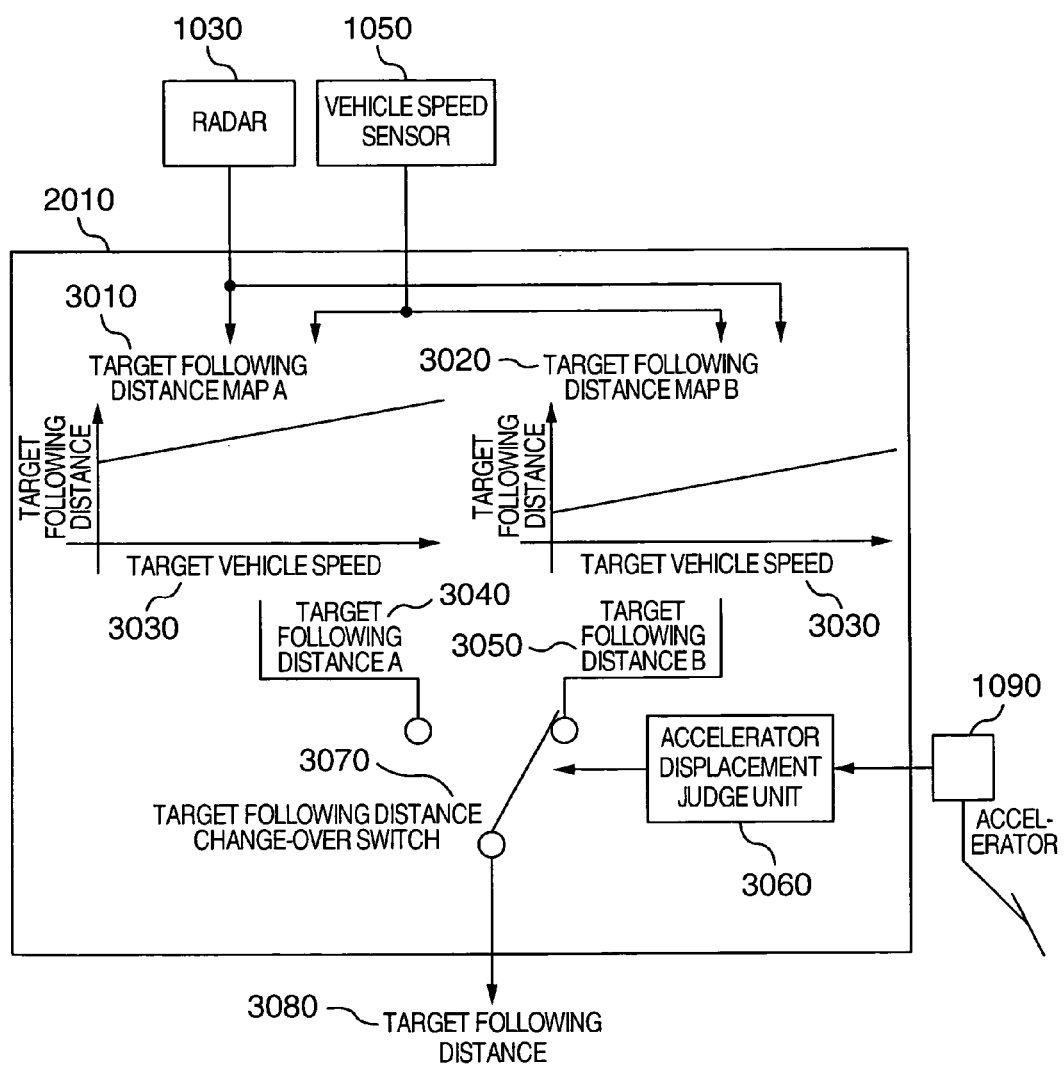
FIG. 3 is a block diagram of a target following distance determining unit.

Referring now to FIG. 3, description will be given of operation of the target following distance determining unit 2010.

The target following distance determining unit 2010 calculates a target vehicle speed 3030 according to the relative velocity from the radar 1030 and the vehicle speed from the vehicle speed sensor 1050 and generates a target following distance map A 3010 and a target following distance map B 3020 using the target vehicle speed 3030 to obtain a target following distance A 3040 and a target following distance B 3050.

An accelerator displacement judge unit 3060 then determine according to the accelerator displacement from the accelerator 1090 whether or not the accelerator is being pushed. If the accelerator is pushed, the unit 3060 accordingly changes over a target following distance change-over switch 3070. The target following distance A 3040 or the target following distance B 3050 is then resultantly output. The selected distance i.e., the following distance selected from the distance maps A or B, as a target following distance 3080 is output.

Figure 4:
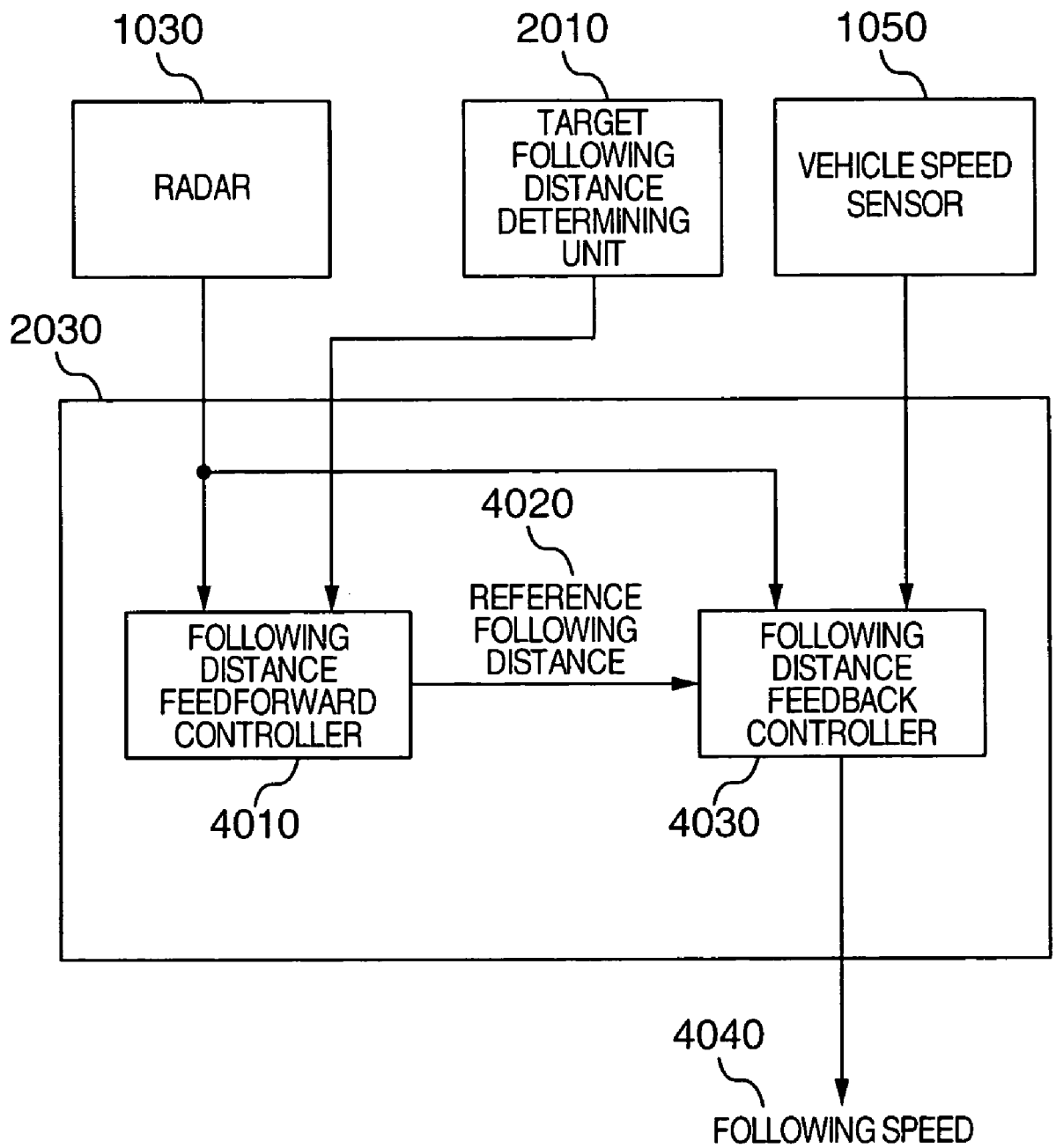
FIG. 4 is a block diagram of a following speed determining unit.

Referring now to FIG. 4, description will be given of operation of the following speed determining unit 2030.

The unit 2030 calculates by a distance feedforward controller 4010 a reference distance 4020 using the following distance and the relative velocity from the radar 1030 and the target following distance from the target distance determining unit 2010. The following speed determining unit 2030 then calculates by a distance feedback controller 4030 a following speed 4040 using the reference distance, the following distance and the relative velocity from the radar 1030 and the velocity speed from the vehicle speed sensor 1050 and outputs the following speed 4040.

Figure 5:
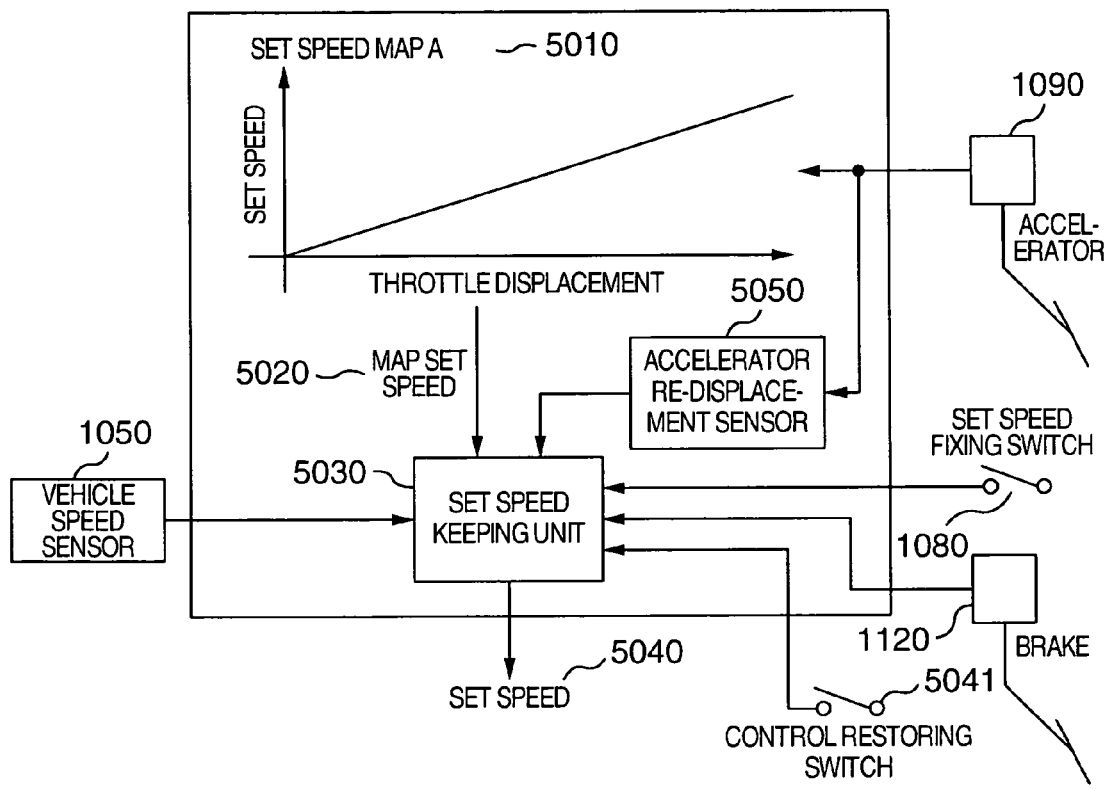
FIG. 5 is a block diagram of a driver set speed determining unit.
Figure 5:
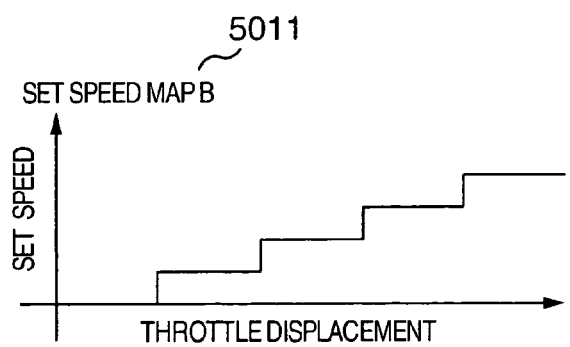

Next, referring to FIG. 5, description will be given of operation of the set speed determining unit 2020.

The unit 2020 generates a driver set speed map A 5010 using the accelerator displacement from the accelerator 1090 to obtain a map set speed 5020. In this operation, to prevent an event in which a slight change in the accelerator pedal displacement adversely influences the map set speed 5020 to resultantly cause an unstable state of the car, the set speed map may be generated, for example, in a contour like stairs such as a driver set speed map B 5011 or reaction force of the accelerator 1090 may be changed according to the accelerator displacement to appropriately restrict the movement of the accelerator 1090.

When a set speed keeping unit 5030 senses an edge from an off state to an on state of the set speed fixing switch 1080, the map set speed 5020 is kept unchanged, and the set speed is outputted as the driver set speed 5040. When the unit 5030 does not sense the off-to-on edge, the map set speed 5020 is directly outputted. During the set speed keeping state, if an accelerator re-displacement sensor 5050 senses another displacement of the accelerator 1090 after the set speed is kept unchanged as above, the keeping of the map set speed 5020 is released, and the map set speed 5020 is outputted as the driver set speed 5040. During the set speed keeping state, if a braking signal is inputted from the brake pedal 1120, the set speed kept unchanged as above is cleared to release the control operation. In a case in which the driver desires, after releasing the control by use of the brake, to restore the set speed previously kept as above to continue the control operation, it is also possible to store the set speed kept when the brake is used such that when a control restoring switch 5041 is depressed, the control operation is restored using the stored set speed.

It is also possible that the set speed fixing switch 1080 keeps the set speed only when the vehicle speed from the vehicle speed sensor 1050 is within a range of from a predetermined lowest speed to a predetermined highest speed.

Figure 6:
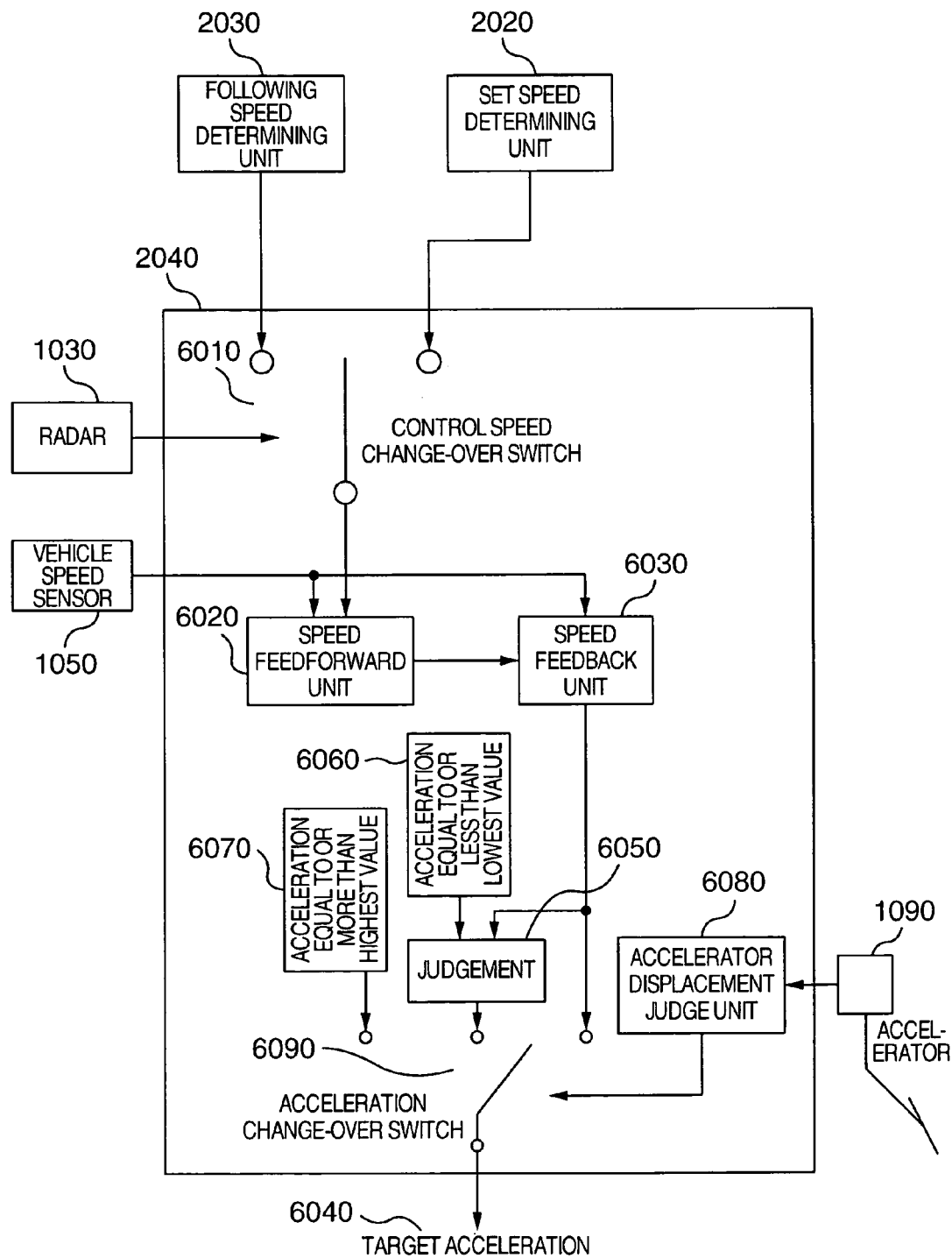
FIG. 6 is a block diagram of an acceleration controller.

Referring now to FIG. 6, description will be given of operation of the acceleration controller 2040.

The acceleration controller 2040 selects a target vehicle speed by a control speed change-over switch 6010. That is, the switch 6010 selects either one of the following speed from the following speed determining unit 2030 and the driver set speed from the set speed determining unit 2020. The switch 6010 operates according to target vehicle information from the radar 1030. More specifically, if the target vehicle is being sensed, the switch 6010 selects the following speed as the target speed. Otherwise, the switch 6010 selects the driver set speed as the target speed.

A speed feedforward (FF) controller 6020 then calculates reference acceleration, which is necessary for changing the vehicle speed to the target speed during a predetermined time of period, using the target speed and the vehicle speed from the vehicle speed sensor 1050. A speed feedback (FB) controller 6030 calculates control acceleration to equalize the reference acceleration to actual acceleration calculated using the vehicle speed.

An accelerator displacement judge unit 6080 then makes a check to determine whether the accelerator displacement inputted from the accelerator 1090 is less than a predetermined lowest threshold value, within a range of from a lowest threshold value to a highest threshold value, or equal to or more than the highest threshold value. According to the determination, the judge unit 6080 changes over an acceleration change-over switch 6090. Specifically, if the accelerator displacement is less than the predetermined lowest threshold value, the judge unit 6989 selects the lower one of the selected acceleration and the control acceleration. If the accelerator displacement is within the range from a lowest threshold value to a highest threshold value, the judge unit 6989 selects the control acceleration. If the accelerator displacement is equal to or more than the highest threshold value, the judge unit 6989 selects the selected acceleration. As a result, the judge unit 6989 outputs the obtained acceleration as a target acceleration 6040.

The torque controller 2050 then calculates torque of a driving axle by multiplying the target acceleration 6040 by the weight of the vehicle and the radius of a tire of the vehicle.

Figure 7:
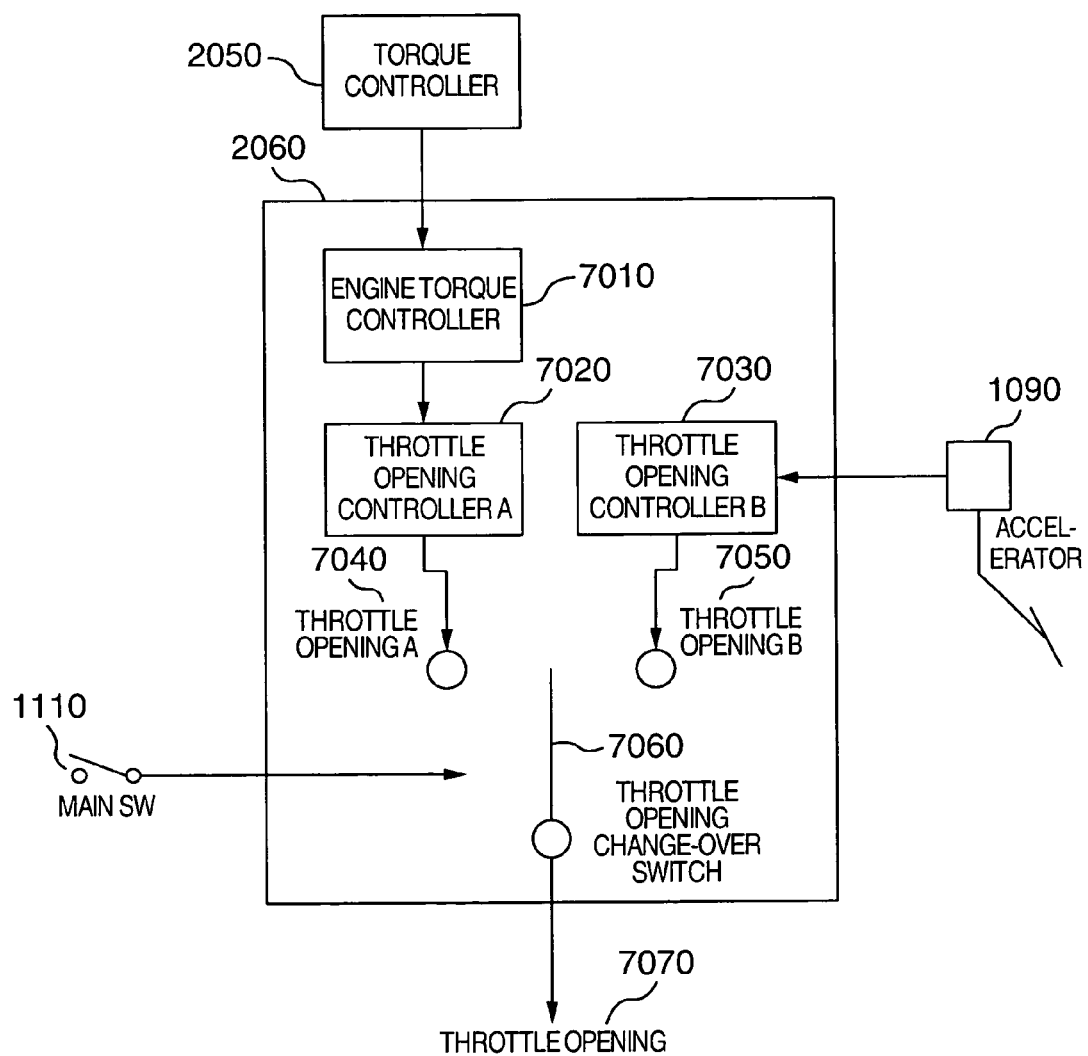
FIG. 7 is a block diagram of a throttle opening controller.

Referring next to FIG. 7, description will be given of operation of a throttle opening controller 7010.

The controller 7010 calculates by an engine torque controller 7010 engine torque using the driving axle torque from the torque controller 2050. The controller 7010 then calculates by a throttle opening controller A throttle opening A 7040 using the engine torque.

A throttle opening controller B calculates throttle opening B 7050 using the accelerator displacement inputted from the accelerator 1090.

A throttle opening change-over switch 7060 selects the throttle opening A if the main switch 1110 is on and selects the throttle opening B if the main switch 1110 is off to output the selected opening as throttle opening 7070.

As above, when the main switch 1110 is on, the accelerator 1090 is separated from the throttle control and conducts only operation for the driver set speed.

The brake fluid controller 2070 calculates brake fluid pressure by multiplying the torque by brake items calculated using, for example, a pat μ, a rotor radius, a pat area, and a piston radius to thereby control the brake.

When the power source to drive the vehicle is not an engine but, for example, a motor, it is also possible to calculate, for example, a current value using the driving axle torque to control the motor.

According to the configuration described above, after the adaptive cruise control is released, the control can be easily restored by a simple operation. It is also possible to prevent an undesirable operation of the vehicle after the control is restored.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An adaptive cruise control system, comprising:
   a vehicle speed control amount calculating unit for calculating a vehicle speed control amount according to a driver set speed set in advance by a driver via a pedal and a vehicle speed of the vehicle, to equalize the vehicle speed of the vehicle to the driver set speed;
   a control unit for controlling an accelerating unit and a decelerating unit according to the vehicle speed control amount;
   a measuring unit for measuring a following distance for the vehicle to follow a target vehicle and a relative speed of the vehicle with respect to the target vehicle;
   a target following distance calculating unit for calculating a target following distance according to the following distance and the relative speed of the vehicle with respect to the target vehicle and the vehicle speed of the vehicle, wherein the target following distance differs as between periods when the pedal is depressed and periods when it is not depressed;
   a following distance control amount calculating unit for calculating a following distance control amount to equalize the following distance to the target following distance; and
   a control unit for controlling an accelerating unit and a decelerating unit to accelerate or to decelerate the vehicle speed of the vehicle according to the vehicle speed control amount, wherein
   the driver set speed is changed according to displacement of the pedal,
   acceleration or deceleration of the vehicle is controlled according to the following distance control amount when a target vehicle is sensed, and
   acceleration or deceleration of the vehicle is controlled according to the vehicle speed control amount when a target vehicle is not sensed.

2. An adaptive cruise control system according to claim 1, wherein when the displacement of the pedal is less than a predetermined threshold value, the vehicle is decelerated regardless of the vehicle speed control amount and the following distance control amount.

3. An adaptive cruise control system according to claim 1, wherein when the displacement of the pedal is equal to or more than another predetermined threshold value, the vehicle is accelerated regardless of the vehicle speed control amount and the following distance control amount.

4. An adaptive cruise control system according to claim 1, wherein the driver set speed and the vehicle speed of the vehicle are displayed on an indicator in a cabin of the vehicle.

5. An adaptive cruise control system according to claim 1, wherein the driver set speed is stepwise changed.

6. An adaptive cruise control system according to claim 1, wherein reaction force of the pedal is changed according to the displacement of the pedal.

7. An adaptive cruise control system according to claim 1, further comprising a function for starting, at restoration of vehicle speed control, the vehicle speed control using the driver set speed in the previous control.

8. An adaptive cruise control system according to claim 1, wherein when the following distance is less than a predetermined threshold value, an alarm is sounded.

9. An adaptive cruise control system according to claim 1, wherein when the displacement of the pedal is equal to or more than a predetermined threshold value, the sounding of the alarm is stopped.

10. An adaptive cruise control system according to claim 1, further comprising a function to keep the driver set speed regardless of the displacement of the pedal.

11. An adaptive cruise control system according to claim 1, wherein when the vehicle speed of the vehicle is equal to or more than a predetermined threshold value, the keeping of the driver set speed is released.

12. An adaptive cruise control system according to claim 1, wherein when the vehicle speed of the vehicle is less than a predetermined threshold value, the keeping of the driver set speed is released.

13. An adaptive cruise control system according to claim 1, wherein the vehicle is controlled to decelerate when the pedal is decreasingly displaced.

14. A vehicle speed control system for controlling a host vehicle, comprising:
   storing means for storing a set speed set by a driver;
   detecting means for detecting a running speed of the host vehicle; and
   control means for controlling the host vehicle to equalize the running speed to the set speed;
   wherein the set speed is changed according to displacement of an accelerator pedal of the host vehicle.

15. The vehicle speed control system according to claim 14, wherein when the displacement of the pedal is less than a first predetermined threshold value, the host vehicle is decelerated regardless of the running speed of the host vehicle.

16. The vehicle speed control system according to claim 14, wherein when the displacement of the pedal is equal to or more than a second predetermined threshold value, the host vehicle is accelerated regardless of its running speed.

17. The vehicle speed control system according to claim 14, wherein the driver set speed and the running speed of the host vehicle are displayed on an indicator in a cabin of the host vehicle.

18. The vehicle speed control system according to claim 14, wherein the set speed is changed stepwise.

19. The vehicle speed control system according to claim 14, wherein reaction force of the pedal changes according to the displacement of the pedal.

20. The vehicle speed control system according to claim 14, further comprising a function for starting, at restoration of vehicle speed control, the vehicle speed control using the set speed in the previous control.

21. The vehicle speed control system according to claim 14, further comprising a function to keep the set speed regardless of the displacement of the pedal.

22. The vehicle speed control system according to claim 7, wherein when the running speed of the host vehicle is equal to or more than a predetermined threshold value, the keeping of the set speed is released.

23. The vehicle speed control system according to claim 7, wherein when the running speed of the host vehicle is less than a predetermined threshold value, the keeping of the set speed is released.

24. The vehicle speed control system according to claim 14, wherein the host vehicle is controlled to decelerate when the pedal is displaced decreasingly.

25. The vehicle speed control system according to claim 14, further comprising:
   a measuring means for detecting a target vehicle and measuring an inter-vehicle distance and a relative speed between the host vehicle and the target vehicle; and
   a means for calculating a target inter-vehicle distance based on the running speed of the host vehicle and the relative speed between the host vehicle and the target vehicle; wherein
   when the measuring means cannot detect the target-vehicle, the control unit controls the host vehicle to equalize the running speed to the set speed; and
   when the measuring unit detects the target vehicle, the control unit controls the host vehicle to equalize the inter-vehicle distance to the target inter-vehicle distance.

26. The vehicle speed control system according to claim 25, wherein:
   when the displacement of the pedal is less than a first predetermined thereshold value, the host vehicle is decelerated of its running speed, and regardless of the inter-vehicle distance between the host vehicle and the target vehicle.

27. The vehicle speed control system according to claim 25, wherein when the displacement of the pedal is equal to or more than a second predetermined threshold value, the host vehicle is accelerated regardless of its running speed, and regardless of the inter-vehicle distance between the host vehicle and the target vehicle.

28. The vehicle speed control system according to claim 11, wherein the set speed and the running speed of the host vehicle are displayed on an indicator in a cabin of the host vehicle.

29. The vehicle speed control system according to claim 25, wherein the set speed is changed stepwise.

30. The vehicle speed control system according to claim 25, wherein reaction force of the pedal is changed according to the displacement of the pedal.

31. The vehicle speed control system according to claim 25, further comprising a function for starting, at restoration of vehicle speed control, the vehicle speed control using the set speed in the previous control.

32. The vehicle speed control system according to claim 25, wherein the target inter-vehicle distance differs as between a period when the pedal is depressed and a period when the pedal is not depressed.

33. The vehicle speed control system according to claim 25, wherein when the inter-vehicle distance is less than a predetermined threshold value, an alarm is sounded.

34. The vehicle speed control system according to claim 33, wherein when the displacement of the pedal is equal to or more than a predetermined threshold value, sounding of the alarm is stopped.

35. The vehicle speed control system according to claim 25, further comprising a function to keep the set speed regardless of the displacement of the pedal.

36. The vehicle speed control system according to claim 33, wherein when the running speed of the host vehicle is equal to or more than a predetermined threshold value, keeping of the set speed is released.

37. The vehicle speed control system according to claim 14, wherein when the running speed of the host vehicle is less than a predetermined threshold value, the keeping of the set speed is released.

38. The vehicle speed control system according to claim 25, wherein the host vehicle is controlled to decelerate when the pedal is decreasingly displaced.

* * * * *